United States Patent Office 3,250,244
Patented May 10, 1966

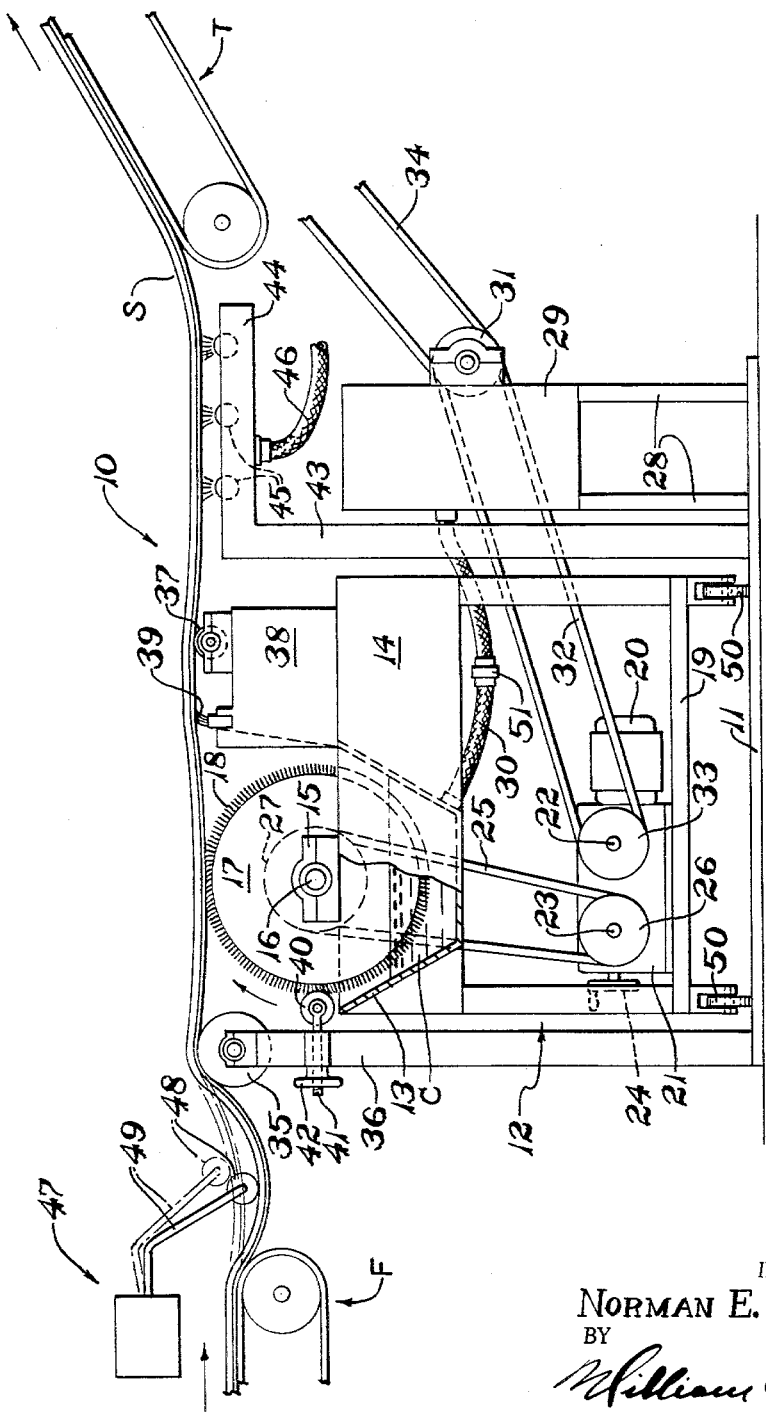

3,250,244
STRIP CEMENTER
Norman E. Reinhart, Cuyahoga Falls, Ohio, assignor to The B. F. Goodrich Company, New York, N.Y., a corporation of New York
Filed Oct. 16, 1962, Ser. No. 230,877
2 Claims. (Cl. 118—6)

This invention relates to an apparatus for applying viscous, liquid material to the surface of strip material, and, more particularly, to an apparatus for applying liquid adhesive material to the underside of vehicular tire tread strips during tire manufacture.

In the present day method of manufacturing vehicle tires it has been found desirable to cement and dry the formed tread strip prior to its being cut to a desired length for application to a tire carcass which has been built previously on a tire building drum. In the past, the tread strips were extruded and cemented after being turned over from their extrusion orientation. To accomplish this, the tread strip had to be longitudinally warped about turning rolls or its direction sharply reversed to present the under surface in a desired upward position. In warping or reversing the strip it became distorted causing unwanted deformations therein. Cement was then sprayed or poured on the surface of the strip and brushed back by stationary brushes disposed in the path of the strip. As a result of these methods, the problems inherent in overspray and runoff of the cement were encountered.

Furthermore, in attempting to cement strip material, such as tread strips, after the strip has cooled down from extruding temperature it becomes necessary to "break" the surface of the strip to insure a proper bond of the cement to the strip material. This could not be accomplished by simply spraying or brushing the cement onto the strip.

It is an object of this invention, therefore, to provide an apparatus for applying adhesive material to the under surface of a continuous tread strip as it is moved in the direction of its length.

It is another object of this invention to provide an apparatus, in combination with a supply conveyor and a takeaway conveyor, wherein a continuous strip of elastomeric tread material trained therebetween may be cemented uniformly and with a predetermined amount of cement, with said cement being completely dried before being received by the takeaway conveyor.

It is a further object of this invention to provide an apparatus as defined in the preceding paragraph wherein a cement applicator roll is driven in contact with the tread strip at a greater peripheral speed than the tread strip, whereby the cement being applied thereto may be wiped into intimate contact with the tread under surface.

Additional objects and advantages to be gained through the use of the present invention will be apparent to those experienced in the art to which it pertains, from the following detailed description of the presently preferred embodiment thereof, and with reference to the drawing, forming a part of this application, in which FIGURE 1 is a side elevational view of the apparatus as shown in combination with a supply conveyor and a takeaway conveyor.

With reference to FIGURE 1, the apparatus 10 comprises a base plate 11 on which is movably supported a cementing carriage 12, disposed between the discharge end of a strip feed conveyor F and the feed end of a take-away conveyor T. The carriage 12 comprises a trough-like cement tank 13, the ends of which are formed by vertical side supports 14. Rotatably journalled above side supports 14, by means of pillow blocks 15, is a shaft 16. Keyed to shaft 16 for rotation therewith is a roller 17, a portion of which protrudes downward into a supply of cement C in the cement tank 13. Covering the periphery of roller 17 is a tufted fabric 18, the tufts of which extend radially of roller 17.

On a support platform 19, forming a portion of the carriage 12 below cement tank 13, is a drive motor 20. Motor 20 is connected to a speed reducer 21 having a fixed ratio output through shaft 22, and a variable speed ratio output through shaft 23. The speed of shaft 23 may be controlled by turning a control wheel 24. A drive belt 25 connects a belt sheave 26 on shaft 23 to a sheave 27 keyed to shaft 16, to rotate roller 17 in response to actuation of motor 20.

Mounted above base plate 11, by means of legs 28, is a constant level cement supply tank 29, containing a reservoir of the cement C, in communication with tank 13 by means of a flexible hose 30, and which maintains the cement level in tank 13 above the lower portion of roller 17.

Mounted on the supply tank 29 is a rotatable double belt sheave 31. A belt 32 passes about sheave 31 and a sheave 33 mounted on the fixed output shaft 22 of reducer 21. A transmission belt 34 supplies driving power to the takeaway conveyor T in a manner well understood in the art and therefore not illustrated in detail. Thus, it will be seen that by varying the output of shaft 23 from reducer 21, by means of control wheel 24, that the peripheral speed of roller 17 may be varied with respect to the takeway speed of conveyor T.

The tread strip material S coming from supply conveyor F is trained in a generally horizontal plane above roller 17 and in contact with the tufts of fabric 18 by means of a training roll 35 which is rotatably supported above base plate 11 on vertical stanchions 36. A smaller training roll 37 is rotatably supported above the side supports 14 on carriage 12 by means of vertical plates 38 mounted thereon. Also mounted on and between plates 38 is a soft wiping brush 39, sufficiently wide to span the width of any tread material S to be cemented by the apparatus.

Mounted between stanchions 36 is a rotatable wringer roll 40 which is supported on threaded horizontal rod supports 41. Roll 40 may be advanced toward, or retracted from the surface of the fabric 18 on roll 17 by turning adjustment wheels 42, each of which is mounted on one of the rod supports 41.

Also mounted above base plate 11 by means of a vertical support 43 is an air manifold 44. Manifold 44 comprises a plurality of distribution pipes 45 disposed transversely of the direction of movement of tread stock S through the apparatus 10. The pipes 45 each have a plurality of small jet-like openings in their upper surface, not shown, designed to impinge streams of air on the under side of a tread stock moving from roll 37 to the takeaway conveyor T. It is preferable to supply the manifold 44 with air to an elevated temperature from a source, not shown, by means of a flexible air hose 46, in order to facilitate drying of the cement material C.

The speed of motor 20 may be controlled by means of a festoon control unit 47, familiar to those experienced in the art. Control unit 47 has a rotatable sensing roller 48 pivotally mounted thereto by means of arm 49 which roller 48 normally rests against the upper surface of the tread strip S suspended between the supply conveyor F and the training roll 35. If the tread strip S festooned between conveyor F and roll 35 falls to a low level, as shown in full line in FIGURE 1, unit 47 allows an increase in the electrical current being supplied to motor 20, thereby increasing its speed and increasing the speed of takeaway conveyor T with respect to the supply conveyor F. Thus, the tread strip S festooned between conveyor F and training roll 35 will rise to a level such as is shown in phantom in FIGURE 1. As roll 48 is thus moved upward, unit 47 decreases the amount of current being supplied to motor 20. Thus, control unit 47 will tend to match the speeds of conveyors F and T to prevent any possible stretching or other deformation of the tread strip S therebetween, or any undue amount of festooning between conveyor F and roll 35.

It will be noted that carriage 12 is mounted on wheels 50, whereby it can be moved out of the path of the tread strip material S for ease of maintenance and changing of the cement C in tank 13. Likewise, hose 30 is provided with couplings 51 allowing the hose 30 to be broken at that point to facilitate movement of carriage 12.

*Machine operation*

In using the apparatus 10 the operator trains the tread strip S being fed from the supply conveyor F, beneath roller 48 of control unit 47, and across training rolls 35 and 37 to the takeaway conveyor T. Air under elevated temperature is admitted to hose 46, by means not shown, and motor 20 is energized to start the conveyor T and the rotation of roller 17. The operator then turns the adjustment wheels 42 to force wringer roll 40 against the tufted fabric 18 until the amount of cement C being deposited on the underside of the tread strip S reaches the desired amount. This amount is also controlled to some extent by movement of the control wheel 24 on speed reducer 21. By means of control wheel 24 the speed of the periphery of the tufted material 18 may be adjusted to give the desired wiping action relative to the surface of the particular tread material S which is being cemented. It has been found that material such as deep pile carpeting best serves as the tufted fabric 18, producing extremely uniform cement deposition. Uniformity of deposition is further enhanced through the use of the soft brush 39 disposed across the direction of movement of the tread stock, and which wipes back any excess deposited during initial machine adjustment to fall to tank 13. Through proper control of conveyor speeds and the temperature of the air being supplied to manifold 44, a uniform and well dried deposition of cement C may be applied to the under side of the tread strip S, without the inherent waste and unevenness of the deposition as obtained by prior methods and apparatus, and without the damaging deformation of the tread strip created by former methods.

Although the invention has been described with reference to a presently preferred embodiment thereof, it will be readily apparent to those skilled in the art to which it pertains that additions and changes thereto may be made within the spirit and scope of the following appended claims.

I claim:

1. Apparatus for applying adhesive fluid material to a surface of elastomeric strip material, in combination with a material supplying conveyor and a material takeaway conveyor; comprising, in combination, a strip material supply conveyor; a strip material takeaway conveyor, training means to train strip material in a generally horizontal plane between said supplying conveyor and said takeaway conveyor; a reservoir containing a supply of adhesive fluid material; a roller; a tufted fabric mounted about the circumferential periphery of said roller; means mounting said roller for rotation about an axis parallel to said plane and for sequential movement of each circumferential increment of said tufted fabric through said adhesive fluid to contact with a surface of said strip material in said plane; a regulating roll rotatably movably mounted on said apparatus in axial parallel relationship to said roller; means to move said roll radially to and from said fabric on said roller while maintaining said relationship; adhesive fluid drying means disposed between said training means and said takeaway conveyor; means regulating the speed of said takeaway conveyor in response to the speed at which said strip material is supplied to said apparatus by said supplying conveyor; and means to variably rotate said roller in response to the speed of said takeaway conveyor.

2. Apparatus as defined in claim 1, wherein said last mentioned means further comprises means to rotate said roller in such a direction and speed that the periphery of said tufted fabric in contact with said sheet material moves at a peripheral speed greater than the linear speed of said sheet material in contact therewith.

References Cited by the Examiner

UNITED STATES PATENTS

| | | | |
|---|---|---|---|
| 948,011 | 2/1910 | Goldsmith | 118—239 X |
| 1,017,852 | 2/1912 | Chestnut | 118—262 X |
| 1,801,374 | 4/1931 | Stock | 118—6 |
| 2,016,085 | 10/1935 | Fawkes et al. | 118—210 X |
| 2,316,531 | 4/1943 | Nivling | 118—244 |
| 2,981,638 | 4/1961 | Jones | 118—246 |
| 3,068,119 | 12/1962 | Gotsch | 118—642 X |

FOREIGN PATENTS 195,883   2/1908   Germany.

CHARLES A. WILLMUTH, *Primary Examiner.*

LEON G. MACHLIN, *Assistant Examiner.*